Sept. 11, 1956   J. JOURNEL   2,762,951
ILLUMINATION OF SIGNS AND THE LIKE
Filed March 15, 1952

INVENTOR.
Jacques Journel
BY *Richard ...*
AG'T

United States Patent Office 2,762,951
Patented Sept. 11, 1956

2,762,951
ILLUMINATION OF SIGNS AND THE LIKE
Jacques Journel, Paris, France Application March 15, 1952, Serial No. 276,851

Claims priority, application France March 15, 1951

2 Claims. (Cl. 315—182)

This invention relates to an apparatus for the illumination of signs and the like and constitutes an improvement of the method described in my pending application No. 168,839, filed June 17, 1950, that is to say, of a method of advertising, which consists in producing an intermittent dazzling illumination which is designed to attract attention in a definite direction, to an article or a subject which is illuminated normally.

More specifically, aforesaid application has disclosed, for the purpose of carrying out this method, that is to say, producing a very bright and very brief emission of light, a novel application of the discharge lamp, also called a lightning lamp, that is to say, a lamp in which the flash is obtained by passing the discharge current of a condenser through the gaseous atmosphere of a tube.

In the aforesaid application are disclosed means of prolonging the striking illuminating effect by a less intense illumination, which disappears at the end of a longer or shorter period.

I have now found a novel solution of this problem, when impulse type lamps are utilised for producing the initial flash.

I have in fact contemplated utilising the fact that the charging of the condensers of the feeding apparatus might to a certain extent be regularised by connecting an ordinary incandescent lamp of suitable resistance in series in the primary circuit of the charging transformer. Immediately after the discharge of the condenser, the demand for current due to the establishment of the charge in the condenser leads to a considerable increase of current in the primary, and consequently in the incandescent lamp, which therefore fully lights up. Then, as the condenser becomes charged, the current in the primary winding of the transformer progressively diminishes, and the incandescent lamp is gradually extinguished. If this lamp is suitably located, this results in a progressively decreasing illumination of the advertising panel, which succeeds the intense illumination of the discharge and pleasantly supplements it.

The present invention therefore relates to the utilisation, for the advertising purposes set forth in the original application, of the progressively diminishing illumination given by the ordinary lamp or lamps connected in series with the primary winding of the transformer employed for charging the condensers of the feed box of the impulsion lamp, which, instead of being located inside this box, are placed in reflectors directed towards the advertising panel.

Figure 1:
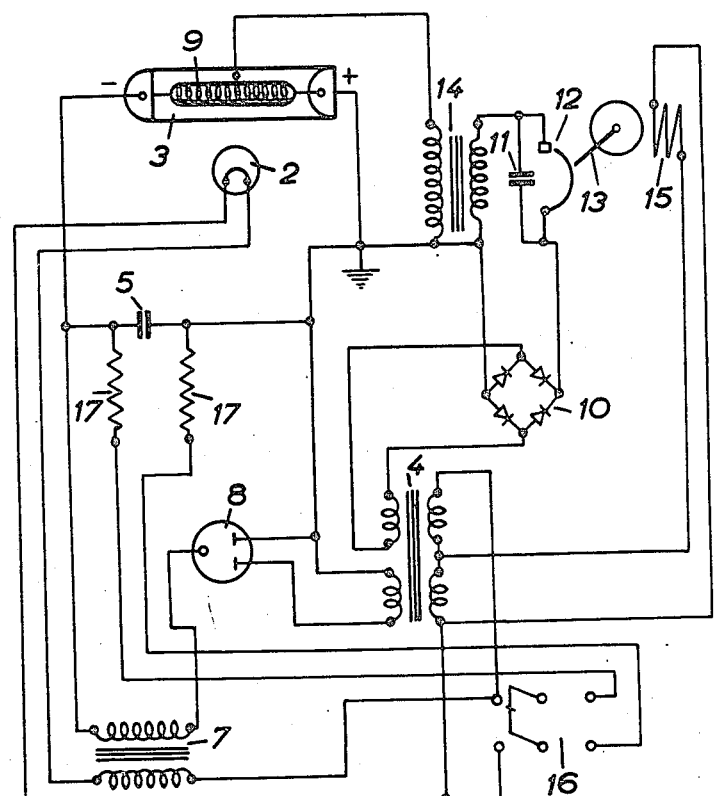
Figure 2:
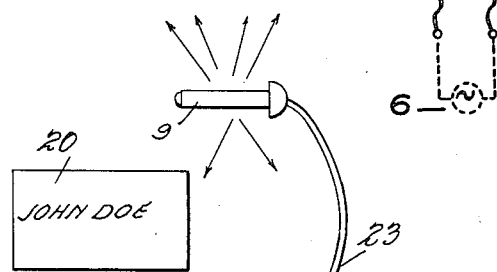
Figure 2:
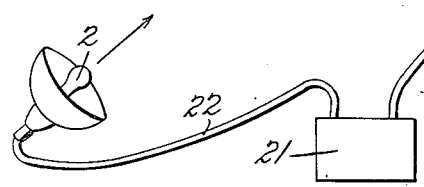

The specification is accompanied by a drawing in which:

Fig. 1 shows a circuit diagram for the apparatus, embodying features of this invention; and Fig. 2 is explanatory of the operation of my apparatus.

Referring to the drawing, and initially to Fig. 1, the incandescent lamp is designated 2, and the lightning lamp 3.

The circuit of the lightning lamp 3 comprises the condenser 5, which is charged from the source 6 through the medium of a transformer 7 and a rectifying valve 8. The source may for instance be the supply mains.

The lightning lamp 3 comprises an auxiliary control grid. If the crest value of the secondary voltage of the transformer 7 is lower than the ignition voltage of the lamp 3, the latter does not light up of itself, and lighting is effected periodically for example. In the diagram an excess voltage applied to a lighting coil 9 has been utilised in a known manner. This periodical excess voltage is obtained by means of a device comprising the impulsion transformer 14, the primary circuit of which comprises the dry rectifier 10, supplied with current on the discontinuous side by the low-tension transformer 4, which likewise effects the heating of the valve 8. In this circuit the impulses are created by the periodical closure occasioned by the switch 12 periodically actuated, by the revolving cam 13 for instance, which is itself actuated by the motor 15. 11 is an auxiliary condenser in parallel with the switch 12, and is provided for the purpose of obviating sparking at break.

In Fig. 2, 20 is a sign to which the attention is to be called. 9 is the discharge lamp disposed a little higher than, and a little backwards relatively to, the sign. 2 is the incandescent lamp disposed to illuminate conveniently the sign. 21 is a box in which most of the circuit apparatus is enclosed. 22, 23 are the connecting electric cables.

This apparatus operates in the following manner. The closure of the circuit of the primary winding of the transformer 14, occasioned by the cam 13 acting upon the switch 12, gives rise to a voltage impulse or wave of tension with a steep front, which releases the ignition of the lightning lamp 3. After the discharge of the condenser 5, the demand for current due to the charge leads to a substantial increase of current in the primary of the transformer 7, and consequently to a sufficiently strong current to render the lamp 2 incandescent, the lamp being suitably selected for this purpose. This lamp then fades out progressively as the current diminishes in consequence of the charging of the condenser.

There will therefore be obtained in succession, for publicity purposes, first a flash, then a normal illumination, which progressively decreases down to the point of extinction.

The utilisation of a plurality of incandescent lamps such as the lamp 2, but of different resistances, would enable the diminution in the lighting to be varied at different parts of the publicity screen, which might be illuminated either by reflection or by transparency, thus obtaining effects adapted to retain the attention of the public.

Upon stoppage, the double switch 16 enables the condenser 5 to be discharged over the resistances 17.

What I claim is:

1. In apparatus of the described character; the combination of an incandescent lamp for illuminating an associated sign, a discharge lamp for calling attention to the sign, a transformer including primary and secondary windings, a source of current, a first circuit connecting in series said source of current, said incandescent lamp and said primary winding, a second circuit including a rectifier connected in series with said discharge lamp and said secondary winding, a condenser in parallel with the discharge lamp, and means periodically causing the discharge of said condenser through said discharge lamp.

2. In an apparatus for the illumination of signs and the like; the combination of an incandescent lamp for periodically illuminating an associated sign, a discharge lamp for calling attention to the associated sign, a transformer including primary and secondary windings, a source of current, means connecting said primary winding of the transformer to said source of current, means connecting said discharge lamp across said secondary winding of the transformer, a condenser connected in parallel with said discharge lamp across said secondary winding, means operative to cause the periodic flashing of said discharge lamp so that said condenser discharges during the periodic flashing and charges during the intervals between the periodic flashing, and means connecting said incandescent lamp in series with said primary winding of the transformer so that the current flowing through said primary winding and incandescent lamp fluctuates between a maximum at the beginning of the charging of said condenser and a minimum at the end of said charging to cause diminishing illumination of the incandescent lamp during the intervals between said periodic flashing of the discharge lamp.

References Cited in the file of this patent

UNITED STATES PATENTS

| 1,952,353 | Barclay | Mar. 27, 1934 |
| 2,015,170 | Ward | Sept. 24, 1935 |
| 2,391,611 | Bock | Dec. 25, 1945 |
| 2,408,764 | Edgerton | Oct. 8, 1946 |
| 2,516,270 | Swain | July 25, 1950 |